UNITED STATES PATENT OFFICE.

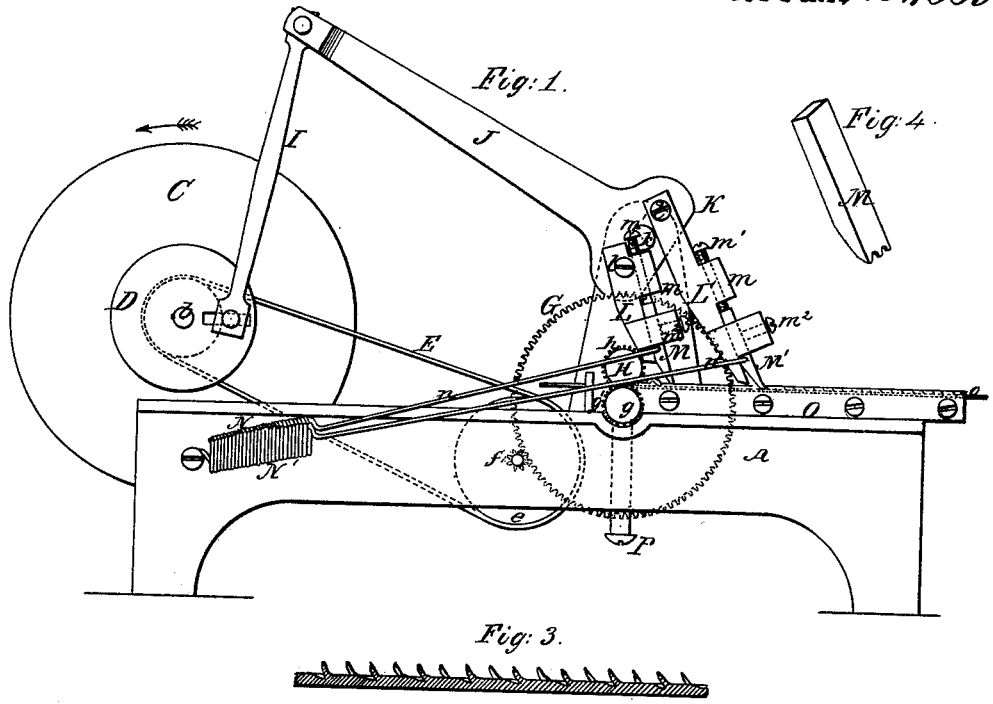
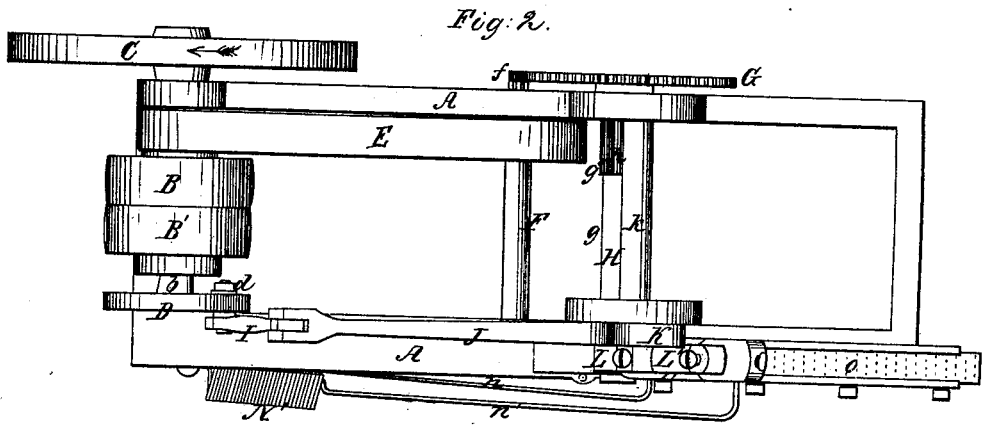

J. BURNS WEST, OF GENESEO, NEW YORK.

IMPROVEMENT IN MACHINES FOR CUTTING RASPS.

Specification forming part of Letters Patent No. 91,293, dated June 15, 1869.

*To all whom it may concern:*

Be it known that I, J. BURNS WEST, of Geneseo, in the county of Livingston and State of New York, have invented certain new and useful Improvements in Machinery for Cutting Rasps, of which the following is a full, clear, and exact description, reference being had to the accompanying drawings, which make part of this specification, and in which—

Figure 1 represents a view in elevation of my improved machine; Fig. 2, a plan or top view of the same; Fig. 3, a longitudinal vertical section through a rasp formed by my machine, showing the mode in which the burrs are raised to form the teeth of the rasp; and Fig. 4, a view in perspective of a portion of the burring tool or cutter.

The object of my invention is automatically to manufacture rasps with teeth of uniform size and shape; and the improvements herein claimed consist—

First. In combining the automatic mechanism for feeding the blank from which the rasp is to be formed with the vibrating burring-tool, which descends upon the blank to raise the burr, and is then raised and retracted for the succeeding stroke, the parts being constructed for joint operation, as set forth.

Second. My invention further consists in combining with the automatic mechanism for feeding the blank at a uniform rate of speed vibrating cutters on opposite sides of an oscillating shaft, and having teeth so arranged that the burrs of one cutter are raised opposite the intervals of the other, as hereinafter described.

Third. My invention further consists in combining with the vibrating burring-tools retracting-springs to restore the cutters to their normal positions, and stops to regulate the extent of their backward movement to insure accurate work, as hereinafter described.

In the accompanying drawings the mechanism is shown as mounted in a stout frame, A. A driving-shaft, $b$, is mounted in suitable bearings in this frame, and carries a fast pulley, B, and a loose pulley, B'. A band from any proper prime-mover rotates this shaft in the usual way. A fly-wheel, C, is mounted on one end of this shaft $b$, and a crank-pulley, D, on the other. A band, E, encircling a small pulley on the driving-shaft, encircles a corresponding pulley, $e$, on a shaft, F. A pinion, $f$, on this shaft drives a gear-wheel, G, on a shaft, $g$, which carries a feed-roller, $g'$. A shaft, H, parallel with but above the shaft $g$, carries another feed-roller, $h$. A radial slot in the crank-pulley D serves to adjust a crank-pin nearer to or farther from the driving-shaft by means of a jam-nut, $d$, to regulate the size of the teeth cut in the blank by varying the length of stroke of the cutters. A pitman, I, connects this crank-pin with the arm J, of a cutter-head, K, oscillating on a rock-shaft, K'. Cutter-stocks L L' swing freely vertically on pivots $l$ on the cutter-head. The cutters M M' slide endwise in slotted guides $m$ in their respective heads L L', and are adjusted up or down by adjusting-screws $m'$, to bring the teeth of one cutter in the intervals between those of the other, and fastened when adjusted by check-screws $m^2$. Spiral springs N N' on the frame are connected with their respective cutters by rods $n n'$.

The operation is as follows: A blank is placed between the feed-rollers $g'$ and $h$, and the driving-shaft rotated in the direction shown by the arrow, and the blank is fed at a uniform speed along the bed O. The bed is constructed of greater length than the blank, in order that the friction of the edges of the rasp against the sides of the bed may assist in resisting the pressure of the cutters, as without some such device the extreme pressure frequently severs the blank. As the arm J rises the cutter M' descends with a steady pressure into the blank, raising a burr for each tooth it may have, as shown by the dots in Fig. 2. As the arm J descends the cutter M forms its burrs in a similar manner while the cutter M' is rising. As it rises its spring $n'$ retracts it preparatory to the next stroke, and keeps it close down to its work.

A set-screw, P, regulates the pressure of the feed-rolls on the blank.

A wick may supply oil to the blank between the feed-rolls and cutters in any well-known way.

What I claim as my invention, and desire to secure by Letters Patent, is—

1. The combination of the automatic feed mechanism with the vibrating burring-tool, all the parts being constructed for joint operation as set forth.

2. The combination of the automatic feed mechanism, vibrating cutters, and oscillating shaft, the whole constructed for joint operation substantially as set forth.

3. The combination of the vibrating-cutters with the retracting springs and stops, the whole constructed for joint operation as set forth.

In testimony whereof I have hereunto subscribed my name.

J. BURNS WEST.

Witnesses:
   JAMES J. CONE,
   WM. H. OLMSTED.